US012788672B2

(12) United States Patent
Wu

(10) Patent No.: US 12,788,672 B2
(45) Date of Patent: Nov. 10, 2026

(54) LEG MASSAGE MACHINE CAPABLE OF MASSAGING POPLITEAL FOSSA

(71) Applicant: Shanghai Rongtai Health Technology Corporation Limited, Shanghai (CN)

(72) Inventor: Dong-Her Wu, Pu Yen Hsiang (TW)

(73) Assignee: Shanghai Rongtai Health Technology Corporation Limited, Shanghai (CN)

(*) Notice: Subject to any disclaimer, the term of this patent is extended or adjusted under 35 U.S.C. 154(b) by 489 days.

(21) Appl. No.: 18/488,654

(22) Filed: Oct. 17, 2023

(65) Prior Publication Data

US 2024/0139062 A1 May 2, 2024

(30) Foreign Application Priority Data

Nov. 2, 2022 (TW) .................................. 111142109

(51) Int. Cl.
*A61H 15/00* (2006.01)
*A61H 39/08* (2006.01)

(52) U.S. Cl.
CPC ......... *A61H 15/0078* (2013.01); *A61H 39/08* (2013.01); *A61H 2015/0021* (2013.01); *A61H 2201/0149* (2013.01); *A61H 2201/1215* (2013.01); *A61H 2201/164* (2013.01); *A61H 2201/1669* (2013.01); *A61H 2201/1676* (2013.01); *A61H 2201/1695* (2013.01); *A61H 2203/0431* (2013.01); *A61H 2203/0437* (2013.01); *A61H 2205/102* (2013.01)

(58) Field of Classification Search
CPC .......... A61H 15/00–0078; A61H 7/007; A61H 2007/009; A61H 39/00–086; A61H 2201/1215; A61H 2205/10–125
USPC .......................................................... 601/118
See application file for complete search history.

(56) References Cited

FOREIGN PATENT DOCUMENTS

| | | | | |
|---|---|---|---|---|
| CN | 106943299 A | * 7/2017 | | A61H 39/04 |
| CN | 109091358 A | * 12/2018 | | A61H 7/007 |
| CN | 209611693 U | * 11/2019 | | A61H 15/0078 |
| CN | 111298366 A | * 6/2020 | | A61H 15/00 |
| CN | 112402235 A | * 2/2021 | | A61H 39/04 |
| CN | 216394648 U | * 4/2022 | | |

(Continued)

OTHER PUBLICATIONS

Translation of CN 106943299. Accessed from PE2E—Search on Mar. 24, 2026. (Year: 2017).*

(Continued)

*Primary Examiner* — Paige Kathleen Bugg
(74) *Attorney, Agent, or Firm* — IPRTOP LLC

(57) ABSTRACT

A leg massage machine capable of massaging popliteal fossa contains: a base, two swing arms, a first massager, and a second massager. The base includes a drive motor, and the drive motor has two driving shafts and two actuation blocks. The two actuation blocks have two eccentric posts. A respective one swing arm includes a drive segment and a driven segmenting. The drive segment has a fixing orifice, and a massaging unit is connected on the drive segment. The first massager includes two first protrusions and two first fixing shafts. At least one first protrusion has a first connecting orifice configured to connect with one actuating shaft of the two swing arms. The second massager includes two second protrusions and two second fixing shafts. At least one second protrusion has a second connecting orifice configured to connect with the other actuating shafts of the two swing arms.

6 Claims, 11 Drawing Sheets

(56) References Cited

FOREIGN PATENT DOCUMENTS

| | | | | | |
|---|---|---|---|---|---|
| CN | 115192403 | A | * | 10/2022 | ............. A61H 7/004 |
| KR | 20210029740 | A | * | 3/2021 | ............. A61H 7/004 |
| WO | WO-2008007015 | A1 | * | 1/2008 | ............. A61H 7/007 |

OTHER PUBLICATIONS

Translation of CN 109091358. Accessed from PE2E—Search on Mar. 24, 2026. (Year: 2018).*
Translation of CN 1111298366. Accessed from PE2E—Search on Mar. 24, 2026. (Year: 2020).*
Translation of CN 112402235. Accessed from PE2E—Search on Mar. 24, 2026. (Year: 2021).*
Translation of CN 115192403. Accessed from PE2E—Search on Mar. 24, 2026. (Year: 2022).*
Translation of CN 209611693. Accessed from PE2E—Search on Mar. 24, 2026. (Year: 2019).*
Translation of CN 216394348. Accessed from PE2E—Search on Mar. 24, 2026. (Year: 2022).*
Translation of KR 20210029740. Accessed from PE2E—Search on Mar. 24, 2026. (Year: 2021).*
Translation of WO 2008/007015. Accessed from PE2E—Search on Mar. 24, 2026. (Year: 2008).*

* cited by examiner

LEG MASSAGE MACHINE CAPABLE OF MASSAGING POPLITEAL FOSSA

TECHNICAL FIELD

The present invention relates to a leg massage machine, and more particularly to the leg massage machine capable of massaging popliteal fossa.

BACKGROUND

Due to the busy life and work pressure of modern people, the body is in a tight state for a long time. Coupled with the lack of exercise, poor blood circulation causes physical and mental fatigue, muscle soreness, and even some cardiovascular diseases. Therefore, in order to improve this situation, many people go for massage, which uses external forces to act on specific parts and acupuncture points on the surface of the human body to regulate physiological functions and alleviate pathological conditions. With the advancement of science and technology, existing massage chairs can provide effective and comfortable massage for the human body's back and legs.

However, the knee joint bears the weight of the whole body and an important part of various activities. Many people have damaged the knee joint due to injury, excessive exercise or the impact of certain diseases. The most common symptoms are pain, reduced activity or joint swelling. On the other hand, moisture in the knees can also lead to poor blood circulation, causing inflammation and pain in the knee joints. In fact, there are several acupuncture points on the back of the knees, commonly known as the knee joints. Stimulating the acupuncture points by tapping and kneading them can relax the knee muscles and improve the knee joints. Soreness can be significantly improved. Most of the existing massage chairs still massage the shoulders, neck, back, buttocks, and legs, but no corresponding massage device has been developed for the knees.

The present invention has arisen to mitigate and/or obviate the afore-described disadvantages.

SUMMARY

The primary aspect of the present invention is to provide a leg massage machine which is capable of massaging two thighs, two calves, and popliteal fossa.

To obtain above-mentioned aspect, a leg massage machine provided by the present invention contains: a base, two swing arms, a first massager, and a second massager.

The base includes a drive motor mounted proximate to a center of the base, the drive motor has two driving shafts extend from two sides of the drive motor, and the drive motor also has two actuation blocks fitted on the two driving shafts. The two actuation blocks have two eccentric posts extending outward from two outer walls of the two actuation blocks.

A respective one swing arm includes a drive segment formed on an end of the respective one swing arm, and the respective one swing arm includes a driven segmenting formed on the other end of the respective one swing arm opposite to the drive segment. The drive segment has a fixing orifice defined on a side of the drive segment and configured to rotatably connect with a respective one eccentric post of a respective one actuation block, and a massaging unit is connected on the drive segment. The driven segment of the respective one swing arm has an actuating shaft extending outward from an outer wall of the drive segment.

The first massager includes two first protrusions extending from two ends of a bottom of the first massager, two first fixing shafts passing through the two first protrusions and configured to rotatably swing the first massager on an end of the base. At least one first protrusion has a first connecting orifice defined on a side thereof and configured to connect with one actuating shaft of the two swing arms so that one swing arm actuates the first massager to swing reciprocately.

The second massager includes two second protrusions extending from two ends of a bottom of the second massager, and two second fixing shafts passing through the two second protrusions and configured to rotatably swing on the other end of the second case, such that the second massager is parallel to the first massager. At least one second protrusion has a second connecting orifice defined on a side thereof and configured to connect with the other actuating shafts of the two swing arms so that the other swing arm actuates the second massager to swing reciprocately.

Preferably, the base includes a first case and a second case, the first case includes two first peripheral plates parallelly extending on two sides thereof, an open segment formed on an end of the first case, two through orifices formed beside the open segment of the first case and passing through the two peripheral plates, and two first bearings fixed on the other end of the first case away from the open segment and on two inner walls of the two first peripheral plates. The first massager is swingably connected between the two first bearings of the first case by using the two first fixing shafts. The second case includes two second peripheral plates parallelly extending on two sides thereof, an open segment formed on an end of the second case, and two ends of the two second peripheral plates are over the open segment of the second case. The second case includes two coupling orifices defined on the end thereof adjacent to the open segment of the second case so that two bolts are configured to connect the second case and the first case via the two coupling orifices and the two passing orifices. The second case further includes two second bearings fixed on the other end thereof away from the open segment of the second case and on two inner walls of the two second peripheral plates, and the second massager is swingably connected between the two second bearings of the second case by using the two second fixing shafts.

Preferably, the first case and the second case of the base are adjustably moved along the two bolts.

Preferably, the massaging unit has a bottom sheet and multiple massage rollers disposed on the bottom sheet.

Preferably, the first massager includes two first racks disposed thereon, the two first racks have two first rolling columns, and the two first rolling columns have two large rolling wheels and two small rolling wheels defined between the two large rolling wheels.

Preferably, the second massager includes two second racks disposed thereon, the two second racks have two second rolling columns, and the two second rolling columns have two large rolling wheels and two small rolling wheels defined between the two large rolling wheels.

Thereby, the leg massage machine is driven by the drive motor so that the two swing arms are actuated to drive the first massager and the second massager to massage the two thighs and the two calves of the user simultaneously. In addition, the two massaging units are connected on the two drive segments of the two swing arms so that the two swing arms move circularly, and the two massaging units massage acupunctures of the popliteal fossae, thus activating the blood in the knee tissue, relaxing the knee joints and expelling toxins to relieve knee pain.

DETAILED DESCRIPTION

Figure 1:
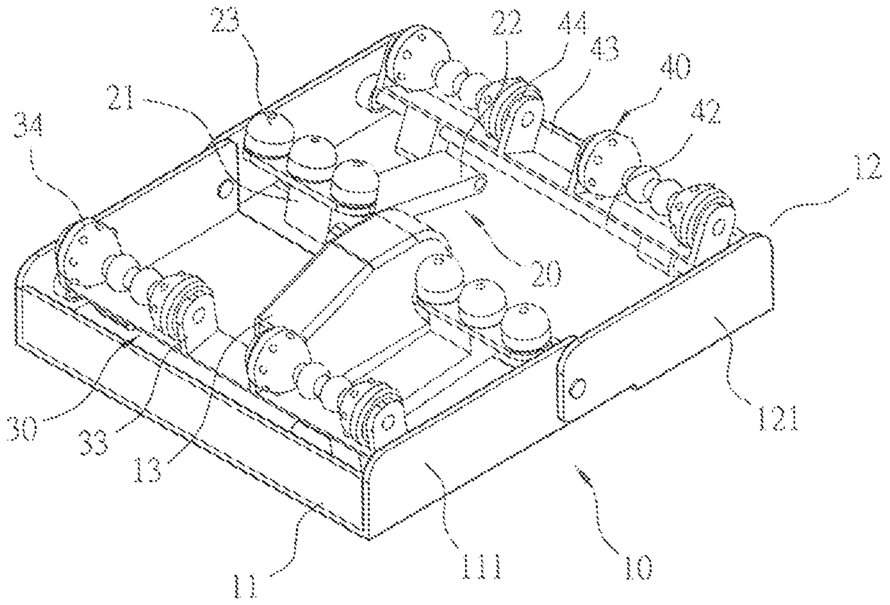
FIG. 1 is a perspective view showing the assembly of a leg massage machine capable of massaging popliteal fossa according to a preferred embodiment of the present invention.
Figure 2:
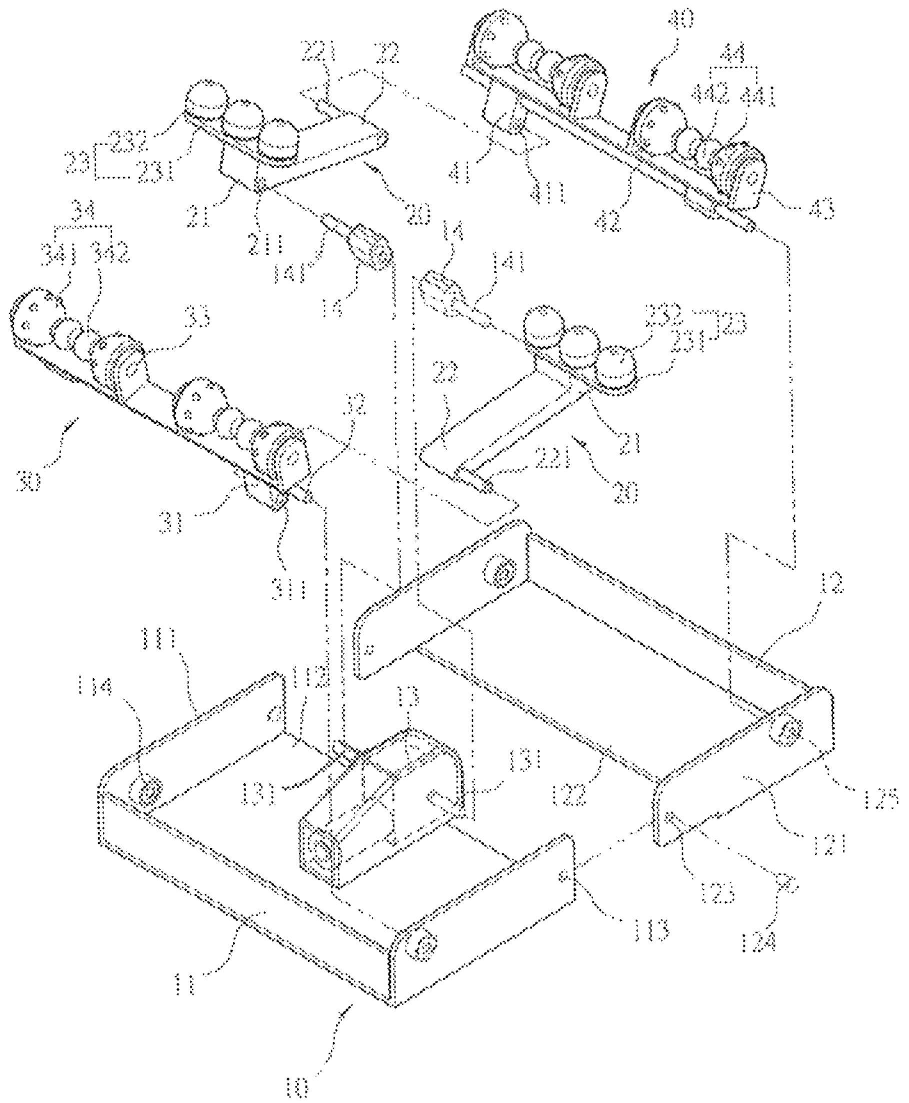
FIG. 2 is a perspective view showing the exploded components of the leg massage machine capable of massaging popliteal fossa according to the preferred embodiment of the present invention.

With reference to FIGS. 1-2, a leg massage machine capable of massaging popliteal fossa according to a preferred embodiment of the present invention comprises: a base 10, two swing arms 20, a first massager 30, and a second massager 40.

The base 10 includes a first case 11 and a second case 12, wherein the first case 11 includes two first peripheral plates 111 parallelly extending on two sides thereof, an open segment 112 formed on an end of the first case 11, two through orifices 113 formed beside the open segment 112 of the first case 11 and passing through the two peripheral plates 111, two first bearings 114 fixed on the other end of the first case 11 away from the open segment 112 and on two inner walls of the two first peripheral plates 111. The second case 12 includes two second peripheral plates 121 parallelly extending on two sides thereof, an open segment 122 formed on an end of the second case 12, wherein two ends of the two second peripheral plates 121 are over the open segment 122 of the second case 12, and the second case 12 includes two coupling orifices 123 defined on the end thereof adjacent to the open segment 122 of the second case 12 so that two bolts 124 are configured to connect the second case 12 and the first case 11 via the two coupling orifices 123 and the two passing orifices 112. The second case 12 further includes two second bearings 125 fixed on the other end thereof away from the open segment 122 of the second case 12 and on two inner walls of the two second peripheral plates 121. The first case 11 further includes a drive motor 13 mounted proximate to a center of the base 10, and the drive motor 13 has two driving shafts 131 extend from two sides thereof, and the drive motor 13 has two actuation blocks 14 fitted on the two driving shafts 131, wherein the two actuation blocks 14 have two eccentric posts 141 extending outward from two outer walls of the two actuation blocks 14.

A respective one swing arm 20 includes a drive segment 21 formed on an end thereof, and the respective one swing arm 20 includes a driven segment 22 formed on the other end thereof opposite to the drive segment 21. The drive segment 21 has a fixing orifice 211 defined on a side thereof and configured to rotatably connect with a respective one eccentric post 141 of a respective one actuation block 14, and a massaging unit 23 connected on the drive segment 21, wherein the massaging unit 23 has a bottom sheet 231 and multiple massage rollers 232 disposed on the bottom sheet 231. The driven segment 22 of the respective one swing arm 20 has an actuating shaft 221 extending outward from an outer wall of the drive segment 22.

The first massager 30 includes two first protrusions 31 extending from two ends of a bottom thereof, two first fixing shafts 32 passing through the two first protrusions 31 and configured to rotatably swing the first massager 30 between the two first bearings 114 of the first case 11, wherein at least one first protrusion 31 has a first connecting orifice 311 defined on a side thereof and configured to connect with one actuating shaft 221 of the two swing arms 20 so that one swing arm 20 actuates the first massager 30 to swing reciprocately. The first massager 30 includes two first racks 33 disposed thereon, wherein the two first racks 33 have two first rolling columns 34, and the two first rolling columns 34 have two large rolling wheels 341 and two small rolling wheels 342 defined between the two large rolling wheels 341.

The second massager 40 includes two second protrusions 41 extending from two ends of a bottom thereof, two second fixing shafts 42 passing through the two second protrusions 41 and configured to rotatably swing the second massager 40 between the two second bearings 125 of the second case 12, such that the second massager 40 is parallel to the first massager 30, and at least one second protrusion 41 has a second connecting orifice 411 defined on a side thereof and configured to connect with the other actuating shafts 221 of the two swing arms 20 so that the other swing arm 20 actuates the second massager 40 to swing reciprocately. The second massager 40 includes two second racks 43 disposed thereon, wherein the two second racks 43 have two second rolling columns 44, and the two second rolling columns 44 have two large rolling wheels 441 and two small rolling wheels 442 defined between the two large rolling wheels 441.

Figure 3:
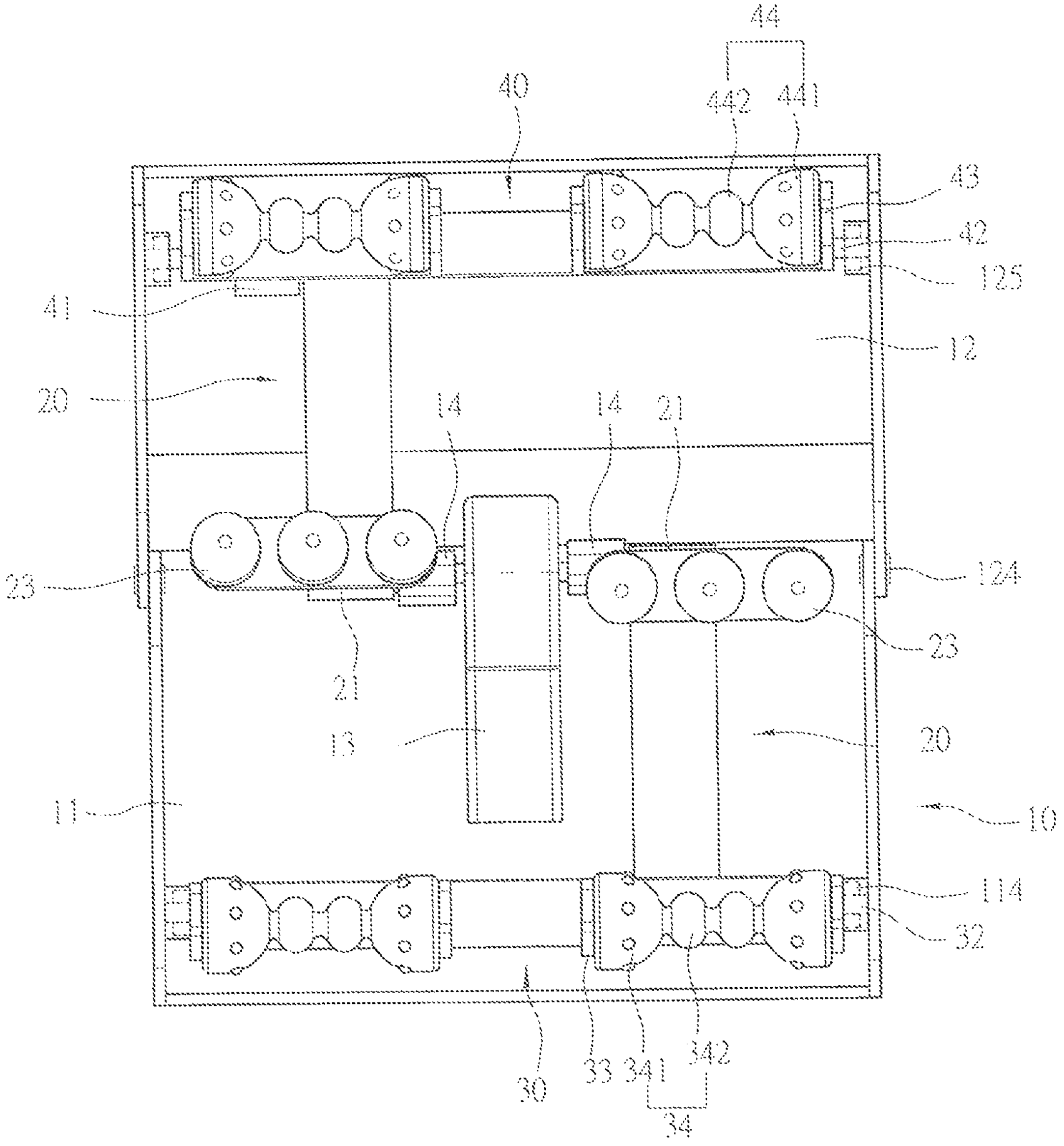
FIG. 3 is a top plan view showing the assembly of the leg massage machine capable of massaging popliteal fossa according to the preferred embodiment of the present invention.
Figure 4:
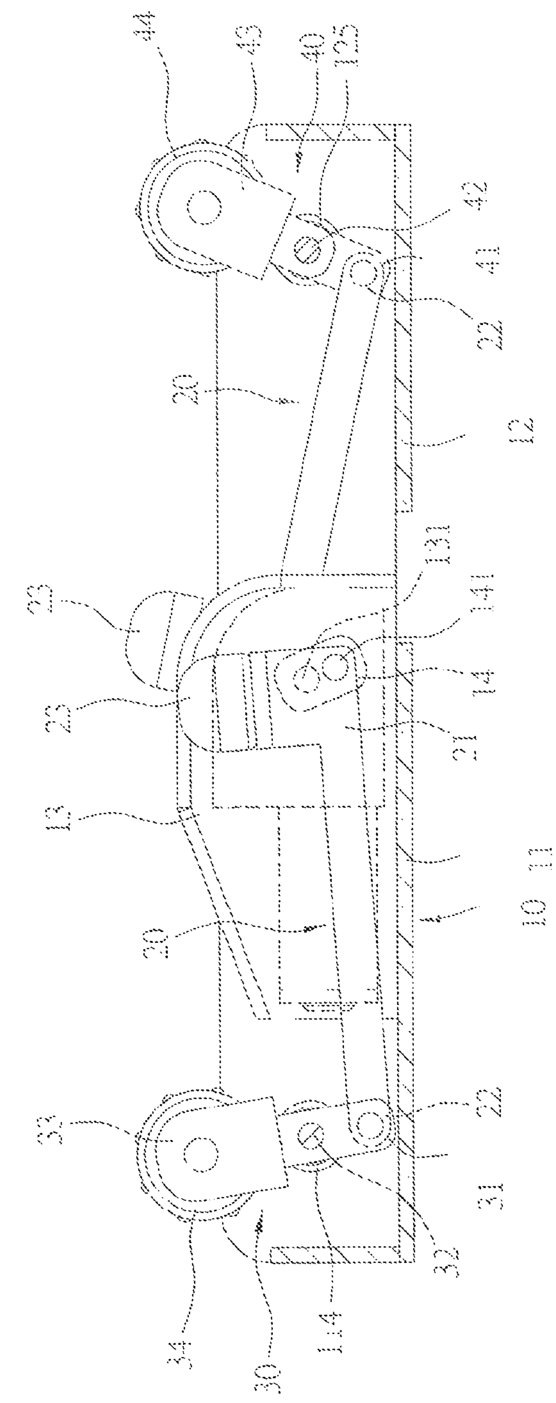
FIG. 4 is a cross sectional view showing the assembly of the leg massage machine capable of massaging popliteal fossa according to the preferred embodiment of the present invention.
Figure 5:
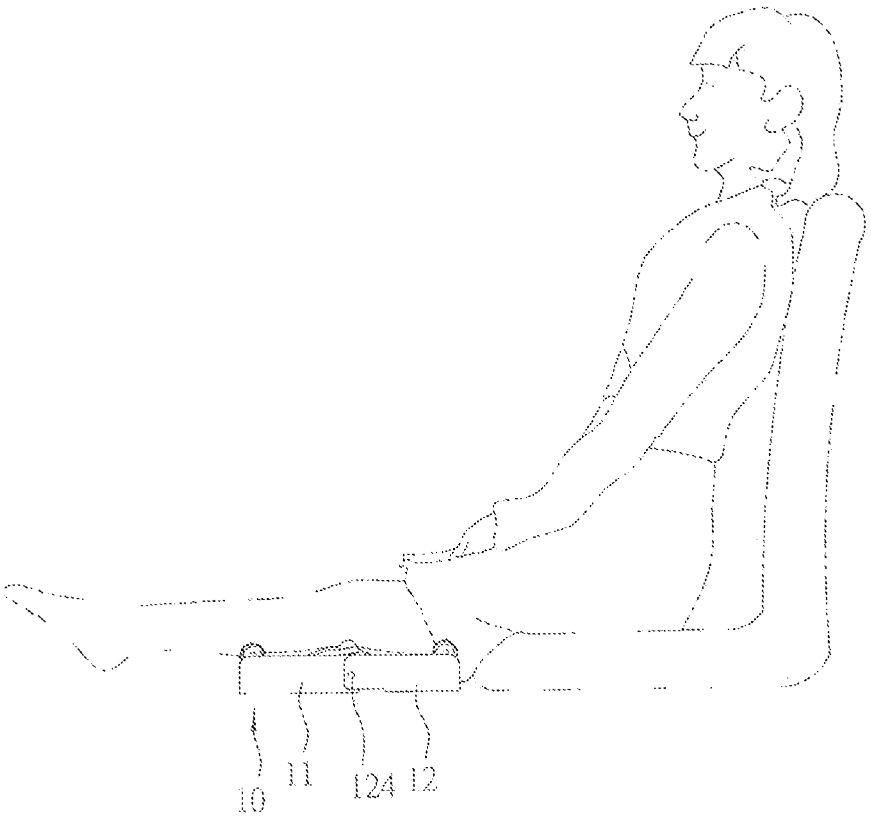
FIG. 5 is a side plan view showing the application of the leg massage machine capable of massaging popliteal fossa according to the preferred embodiment of the present invention.
Figure 6:
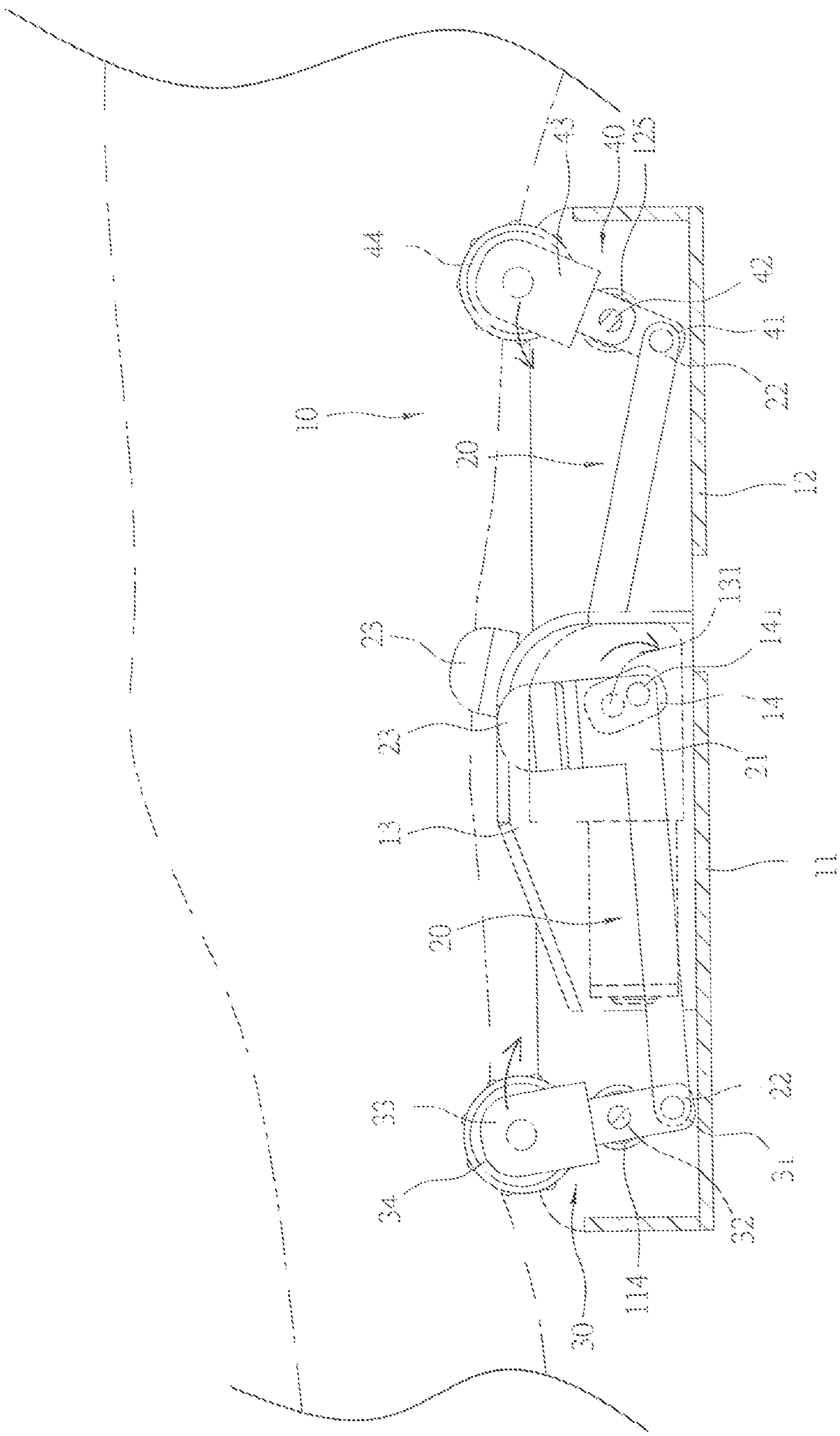
FIG. 6 is a cross sectional view showing the operation of the leg massage machine capable of massaging popliteal fossa according to the preferred embodiment of the present invention.
Figure 7:
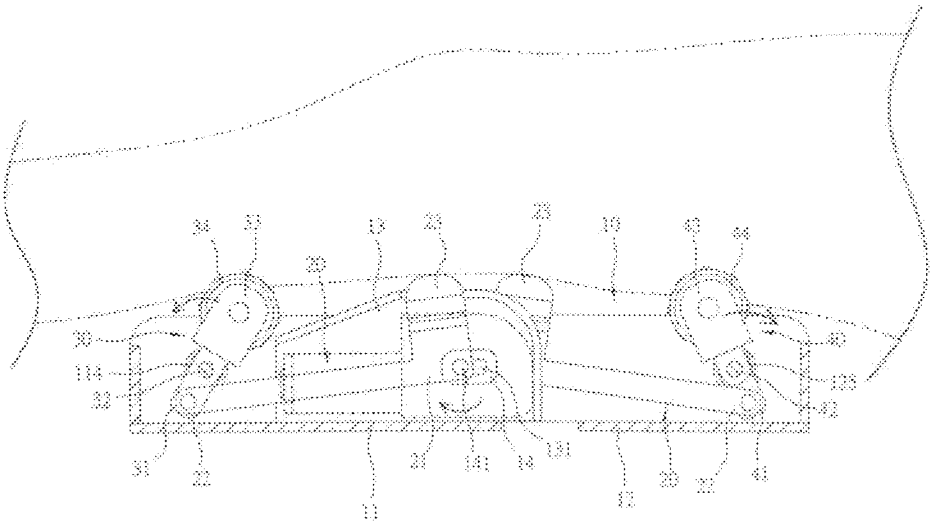
FIG. 7 is another cross sectional view showing the operation of the leg massage machine capable of massaging popliteal fossa according to the preferred embodiment of the present invention.
Figure 8:
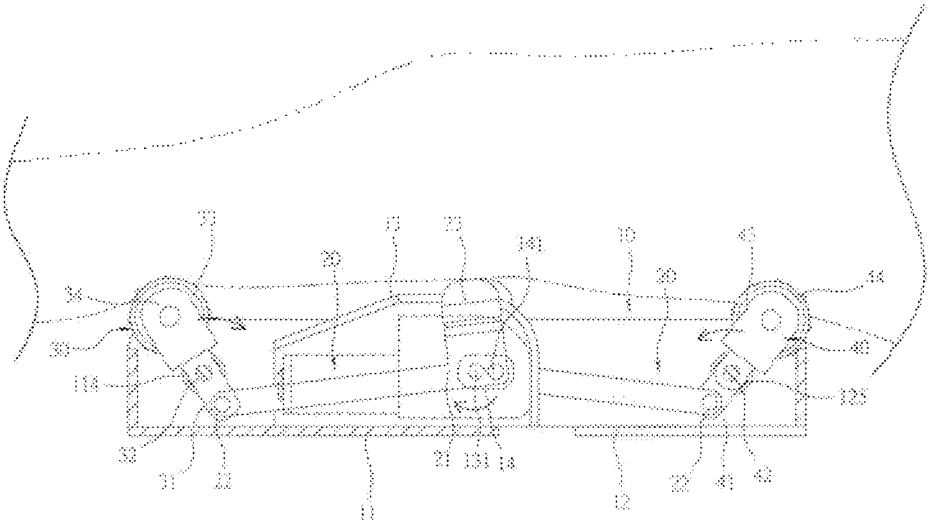
FIG. 8 is also another cross sectional view showing the operation of the leg massage machine capable of massaging popliteal fossa according to the preferred embodiment of the present invention.

Referring to FIGS. 2-4, in assembly, the open segment 112 of the first case 11 faces to the opening segment 122 of the second case 12, and the two through orifices 113 are aligned and communicated with the two coupling orifices 123 so as to connect two through orifices 113 with the two coupling orifices 123 by using the two bolts 124. The drive motor 13 is connected proximate to a center of the open segment 112 of the base 10 and is mounted on the center of the base 10 further, wherein the two swing arms 20 are connected with two eccentric post 141 of two actuation blocks 14 by way of two fixing orifices 211 of two drive segments 21 of the two swing arms 20, then two actuation blocks 14 are connected with the two driving shafts 131 of the drive motor 13, wherein two driven segments 22 of the two swing arms 20 extend oppositely. For example, one driven segment 22 of one swing arm 20 is disposed in the first case 11, and the other driven segment 22 of the other swing arm 20 is mounted in the second case 12. The first massager 30 is swingably connected between the two first bearings 114 of the first case 11 by using the two first fixing shafts 32, and the first connecting orifice 311 of one first protrusion 31 is rotatably connected with the actuating shaft 221 of the one swing arm 20. The second massager 40 is swingably connected between the two second bearings 125 of the second case 12 by using the two second fixing shafts 42, and the second connecting orifice 411 of one second protrusion 41 is rotatably connected with the actuating shaft 221 of the one other swing arm 20, hence the first massager 30, the second massager 40 and the two swing arms 20 are connected so that the drive motor 13 drives the two swing arms 20, the first massager 30 and the two second massager 40 to operate simultaneously.

In use, as shown in FIGS. 5-8, the first case 11 and the second case 12 of the base 10 are placed on a ground/floor, a sofa or a bed so that a user puts two legs on the leg massage machine. In this embodiment, two thighs of the user abut against the second massager 40, two calves of the user contact with the first massager 30, and the popliteal fossae among the two thighs and the two calves abuts against two massaging units 23 of the two swing arms 20. When starting the drive motor 13 to operate, two drive segments 21 of the two swing arms 20 are driven by the two eccentric posts 141 of the two actuation blocks 14 to move circularly, thus rubbing and massaging the popliteal fossae by way of the two massaging units 23. When the two drive segments 21 of the two swing arms 20 move circularly, the two driven segments 22 of the two swing arms 20 move forward and backward simultaneously, and the two actuating shafts 221 of the two other swing arms 20 actuate the first massager 30 and the second massager 40 to operate so that the first massager 30 swings forward and backward along the two first fixing shafts 32, and the two first rolling columns 34 massage the two calves of the user. Also, the second massager 40 swings forward and backward along the two second fixing shafts 42 so that the two second rolling columns 44 massage the two thighs of the user.

Furthermore, a position of the first massager 30 and a position of the second massager 40 are changeable by changing a direction of the base 10. For example, the first massager 30 is changed to massage the two thighs of the user, and the second massager 40 is changed to massage the two calves of the user.

Figure 9:
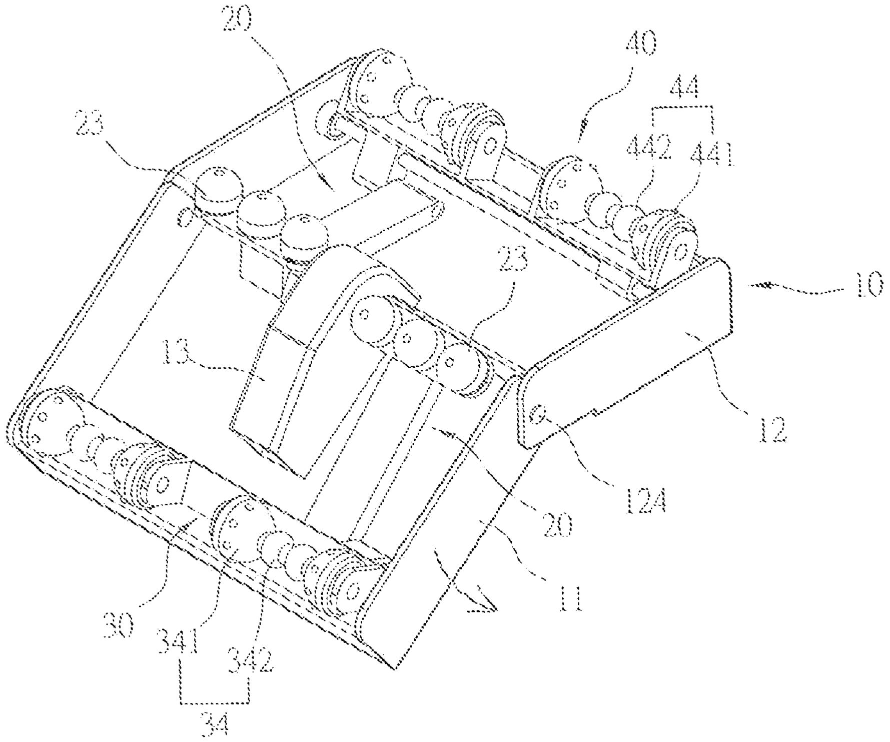
FIG. 9 is a perspective view showing the assembly of a leg massage machine capable of massaging popliteal fossa according to another preferred embodiment of the present invention.
Figure 10:
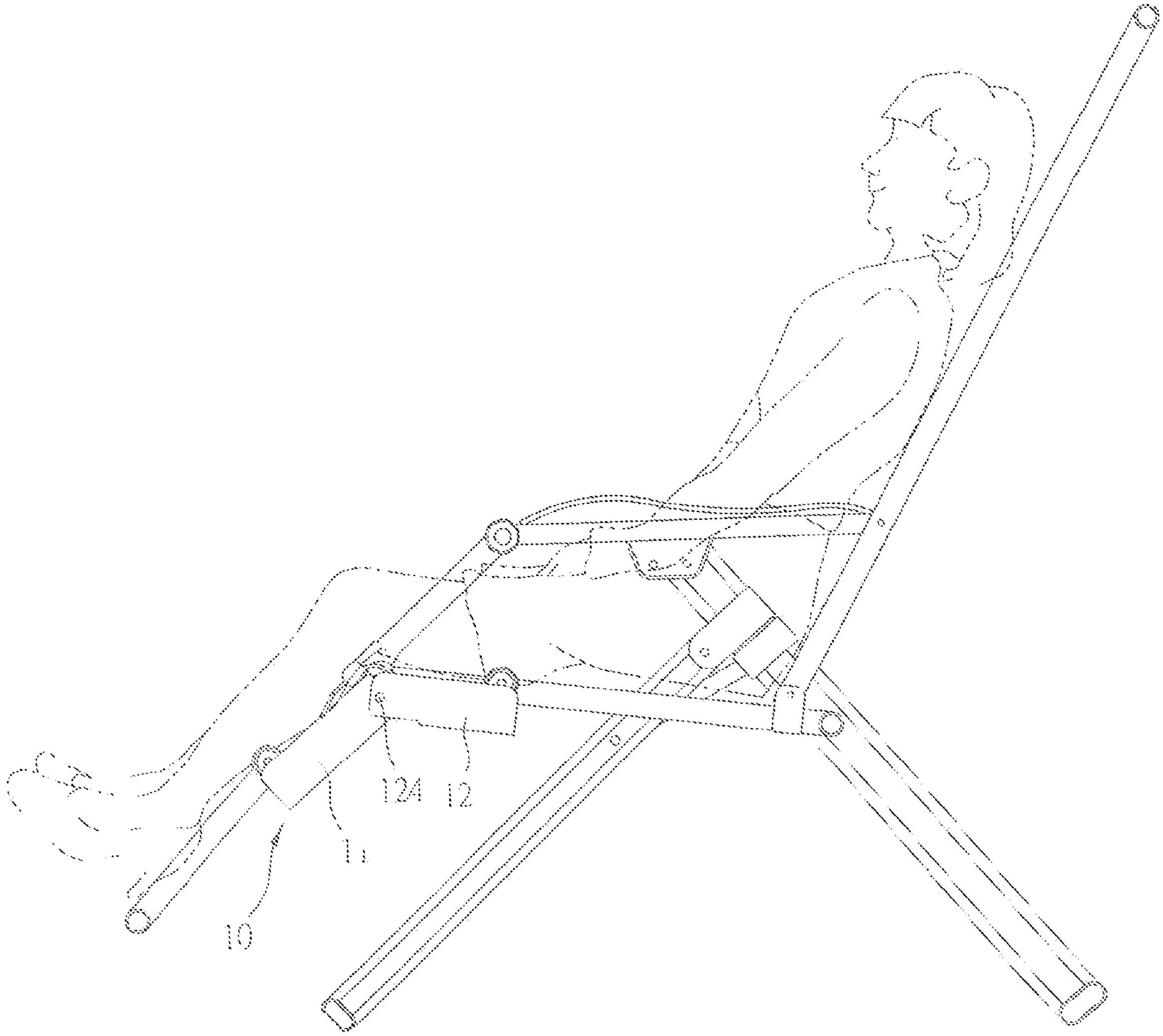
FIG. 10 is a side plan view showing the application of the leg massage machine capable of massaging popliteal fossa according to another preferred embodiment of the present invention.
Figure 11:
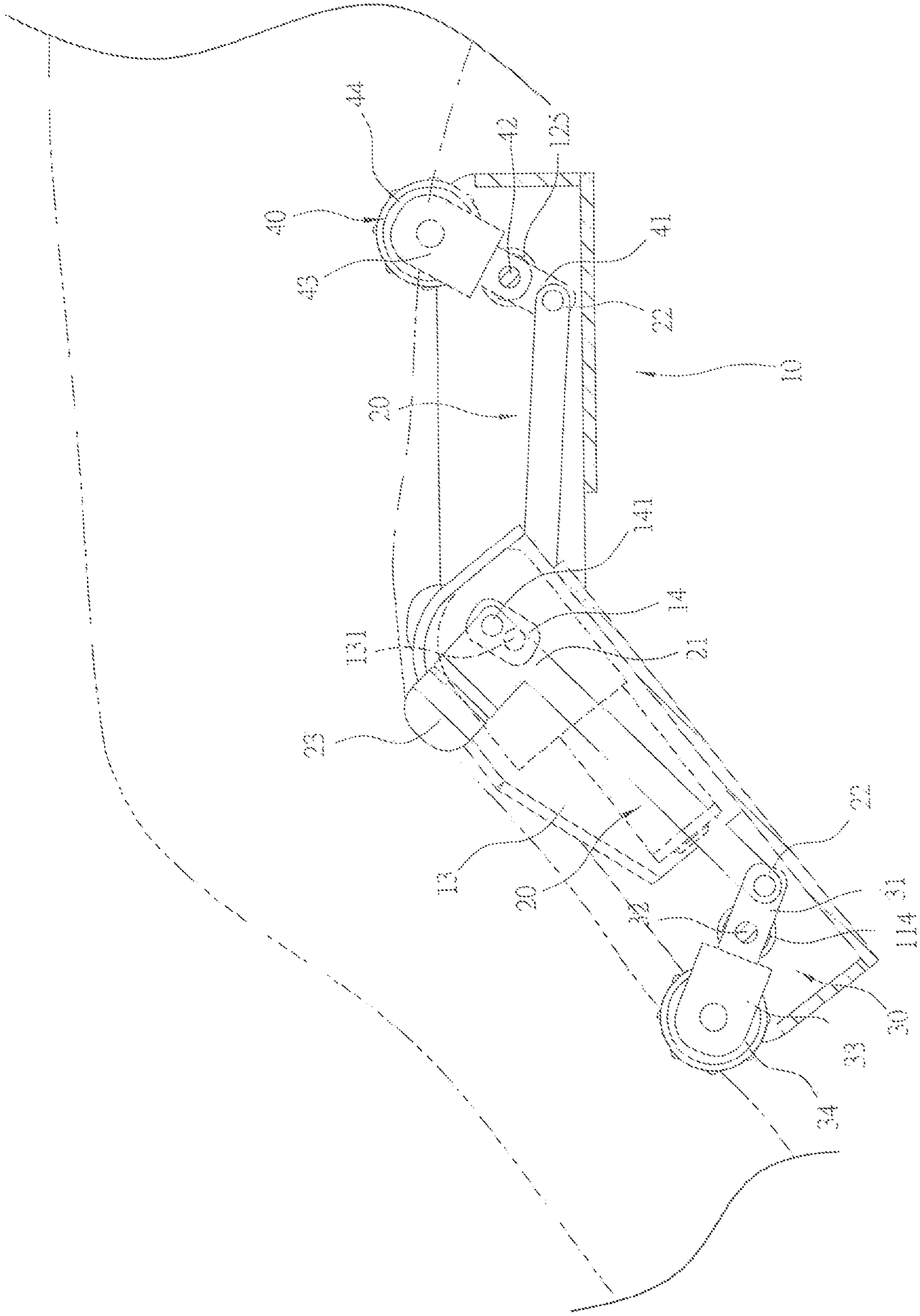
FIG. 11 is a cross sectional view showing the operation of the leg massage machine capable of massaging popliteal fossa according to another preferred embodiment of the present invention.

In another embodiment, as illustrated in FIGS. 9-11, the first case 11 and the second case 12 of the base 10 are adjustably moved along the two bolts 124 so that an angle between the first case 11 and the second case 12 produces, and the base 10 is placed on a front end of a chair (such as a lounge chair or a sofa) at a desired angle. The second case 12 is placed on a seat of the chair flatly and the first case 11 is extended downward along an edge of the seat so that when the user sits on the seat of the chair, the two thighs abut against the second massager 40 of the second case 12, the two calves put and contact with the first massager 30 of the first case 11, and the popliteal fossae contact with two massaging units 23 of the two swing arms 20, thus massing the two thighs, the two calves, and the popliteal fossae. Preferably, the leg massage machine is applicable for the seat of the chair.

Accordingly, the leg massage machine of the present invention has advantages as follows: the leg massage machine is driven by the drive motor 13 so that the two swing arms 20 are actuated to drive the first massager 30 and the second massager 40 to massage the two thighs and the two calves of the user simultaneously. In addition, the two massaging units 23 are connected on the two drive segments 21 of the two swing arms 20 so that the two swing arms 20 move circularly, and the two massaging units 23 massage acupunctures of the popliteal fossae, thus activating the blood in the knee tissue, relaxing the knee joints and expelling toxins to relieve knee pain.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A leg massage machine capable of massaging a popliteal fossa comprising:

a base including a drive motor mounted proximate to a center of the base, the drive motor having two driving shafts extend from two sides of the drive motor, and the drive motor further includes two actuation blocks, each fitted on a respective one of the two driving shafts, wherein each of the two actuation blocks includes an eccentric post extending outward from an outer wall thereof;

two swing arms, wherein each respective one swing arm includes:

a drive segment formed on an end of the respective one swing arm, the respective one swing arm including a driven segment formed on an opposite end of the respective one swing arm opposite to the drive segment, the drive segment having a fixing orifice defined on a side of the drive segment and configured to rotatably connect with a respective one eccentric post of a respective one actuation block of the two actuation blocks, and a massaging unit connected on the drive segment, wherein the driven segment of the respective one swing arm has an actuating shaft extending outward from an outer wall of the drive segment;

a first massager including two first protrusions extending from two ends of a bottom of the first massager, two first fixing shafts passing through the two first protrusions and configured to rotatably swing the first massager on an end of the base, wherein at least one of the two first protrusions has a first connecting orifice defined on a side thereof and configured to connect with one actuating shaft of the two swing arms such that one swing arm is configured to actuate the first massager to swing reciprocately; and a second massager including two second protrusions extending from two ends of a bottom of the second massager, and two second fixing shafts passing through the two second protrusions and configured to rotatably swing on an end of a second case, such that the second massager is parallel to the first massager, wherein at least one of the two second protrusions has a second connecting orifice defined on a side thereof and configured to connect with a second one of the actuating shafts of the two swing arms such that a second of the two swing arms is configured to actuate the second massager to swing reciprocately.

2. The leg massage machine as claimed in claim 1, wherein the base includes a first case and the second case, the first case includes two first peripheral plates extending parallel to each other on two sides thereof, an open segment formed on an end of the first case, two through orifices formed beside the open segment of the first case and each passing through one of the two peripheral plates, and two first bearings fixed on an opposite end of the first case away from the open segment and each located on a respective inner wall of each of the two first peripheral plates, wherein the first massager is swingably connected between the two first bearings of the first case by the two first fixing shafts;

wherein the second case includes two second peripheral plates extending parallel to each other on two sides thereof, an open segment formed on an end of the second case, wherein two ends of the two second peripheral plates extend over the open segment of the second case, and the second case includes two coupling orifices defined on an end thereof adjacent to the open segment of the second case so that two bolts are configured to connect the second case and the first case via the two coupling orifices and the two through orifices; wherein the second case further includes two second bearings fixed on an opposite end thereof away from the open segment of the second case on two respective inner walls of each of the two second peripheral plates, and the second massager is swingably connected between the two second bearings of the second case by the two second fixing shafts.

3. The leg massage machine as claimed in claim 2, wherein the first case and the second case of the base are adjustably moved along the two bolts.

4. The leg massage machine as claimed in claim 1, wherein the massaging unit has a bottom sheet and multiple massage rollers disposed on the bottom sheet.

5. The leg massage machine as claimed in claim 1, wherein the first massager includes two first racks disposed thereon, the two first racks have two first rolling columns, and the two first rolling columns have two large rolling wheels and two small rolling wheels defined between the two large rolling wheels.

6. The leg massage machine as claimed in claim 1, wherein the second massager includes two second racks disposed thereon, the two second racks have two second rolling columns, and the two second rolling columns have two large rolling wheels and two small rolling wheels defined between the two large rolling wheels.

* * * * *